US012726471B2

(12) United States Patent
Hu et al.

(10) Patent No.: US 12,726,471 B2
(45) Date of Patent: Sep. 1, 2026

(54) INTERNET PROTOCOL VERSION 6-BASED MULTI-ELEMENT AUTHENTICATION ROOT SYSTEM

(71) Applicant: Jinqian Hu, Hangzhou (CN)

(72) Inventors: Jinqian Hu, Hangzhou (CN); Ai Guo, Hangzhou (CN); Xinyi Cai, Hangzhou (CN)

( * ) Notice: Subject to any disclaimer, the term of this patent is extended or adjusted under 35 U.S.C. 154(b) by 29 days.

(21) Appl. No.: 18/976,267

(22) Filed: Dec. 10, 2024

(65) Prior Publication Data

US 2025/0211583 A1 Jun. 26, 2025

(30) Foreign Application Priority Data

Dec. 26, 2023 (CN) ........................ 202311806973.X

(51) Int. Cl.

*G06F 21/00* (2013.01)
*H04L 9/40* (2022.01)
*H04L 61/5007* (2022.01)
*H04L 101/659* (2022.01)

(52) U.S. Cl.

CPC ...... *H04L 63/0823* (2013.01); *H04L 61/5007* (2022.05); *H04L 2101/659* (2022.05)

(58) Field of Classification Search

CPC ............. H04L 63/0823; H04L 61/5007; H04L 2101/659; H04L 9/3265; H04L 9/3226; H04L 9/3231; H04L 9/3247

See application file for complete search history.

(56) References Cited

U.S. PATENT DOCUMENTS

| | | | | |
|---|---|---|---|---|
| 7,130,999 | B2 * | 10/2006 | Yasala | H04L 9/3265 713/157 |
| 11,343,080 | B1 * | 5/2022 | Bagley | G06F 21/31 |
| 2015/0312041 | A1 * | 10/2015 | Choi | H04L 63/0861 713/175 |
| 2019/0052614 | A1 * | 2/2019 | Versteeg | H04L 63/06 |
| 2019/0273618 | A1 * | 9/2019 | Marshall | H04L 63/123 |
| 2020/0195436 | A1 * | 6/2020 | Khan | H04L 9/0637 |
| 2021/0051027 | A1 * | 2/2021 | Wang | H04L 9/3239 |
| 2022/0060341 | A1 * | 2/2022 | Ounsworth | H04L 9/007 |
| 2024/0031176 | A1 * | 1/2024 | Yamada | H04L 9/3247 |
| 2024/0267226 | A1 * | 8/2024 | Hu | H04L 63/0823 |
| 2026/0031976 | A1 * | 1/2026 | Kumar | H04L 9/0819 |

* cited by examiner

*Primary Examiner* — Kendall Dolly

(74) *Attorney, Agent, or Firm* — OPENPTO US LLC; Yuhao Liang

(57) ABSTRACT

An internet protocol version 6 (IPv6)-based multi-element authentication root system includes a first acquisition module, a second acquisition module, a third acquisition module, and a root certificate issuing module. The first acquisition module is configured to acquire a plurality of pieces of identity information, a plurality of pieces of enterprise information and an enterprise code of a user; the second acquisition module is configured to acquire an IPv6 digital address of the user; the third acquisition module is configured to acquire a plurality of digital certificates and a plurality of corresponding keys provided by a plurality of certificate authorities; and the root certificate issuing module is configured to perform multi-key verification on the plurality of pieces of authenticated identity information and the plurality of pieces of authenticated enterprise information according to the plurality of digital certificates and the plurality of corresponding keys, and issue a plurality of root certificates.

11 Claims, 6 Drawing Sheets

| Stroke | Name | D_Code |
|---|---|---|
| ㇐ | Horizontal | 01 |
| ㇑ | Vertical | 02 |
| ㇒ | Left-falling | 03 |
| ㇔ | Dot | 04 |
| ㇏ | Right-falling | 05 |
| ㇀ | Raising | 06 |
| ㇇ | Left horizontal falling | 07 |
| ㇖ | Horizontal hook | 08 |
| ㇕ | Horizontal turning | 09 |
| ㇙ | Vertical-rising | 10 |
| ㇗ | Vertical turning | 11 |
| ㇚ | Vertical hook | 12 |
| ㇄ | Vertical turning | 13 |
| ㇂ | Slant hook | 14 |
| ㇁ | Curved hook | 15 |
| ㇃ | Lying hook | 16 |

| Stroke | Name | D_Code |
|---|---|---|
| ㇛ | Left-falling dot | 17 |
| ㇜ | Left-falling turning | 18 |
| ㇠ | Transverse slant hook | 19 |
| ㇊ | Horizontal turning with a rising stroke | 20 |
| ㇍ | Horizontal turning with a curve to the right | 21 |
| ㇆ | Horizontal turning with a hook | 22 |
| ㇅ | Horizontal and redoubled turning | 23 |
| ㇟ | Vertical curved hook | 24 |
| [illegible] | Left vertical turning falling | 25 |
| ㇞ | Vertical and redoubled turning | 26 |
| ㇌ | Left horizontal falling with an upward hook | 27 |
| ㇈ | Horizontal bending with an upward hook | 28 |
| ㇋ | Horizontal and redoubled turning with a left falling | 29 |
| ㇎ | Horizontal and threefold turning | 30 |
| ㇉ | Vertical and redoubled turning | 31 |
| ㇡ | Horizontal and redoubled turning with a hook to the left | 32 |

FIG. 4

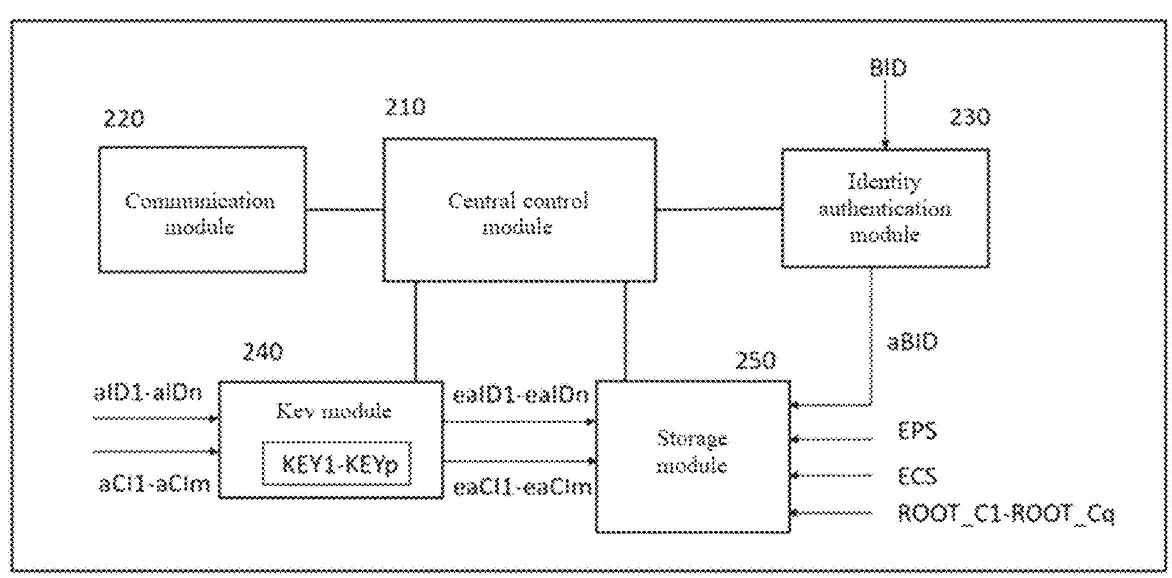

FIG. 5

INTERNET PROTOCOL VERSION 6-BASED MULTI-ELEMENT AUTHENTICATION ROOT SYSTEM

CROSS-REFERENCE TO RELATED APPLICATION

This application claims priority of Chinese Patent Application No. 202311806973.X, filed on Dec. 26, 2023, the entire contents of which are incorporated herein by reference.

TECHNICAL FIELD

The present disclosure relates to the technical field of information security, and in particular to a root system and a method therefor.

BACKGROUND

Root server is a digital trust service facility. However, the conventional root server usually requires authentication process of the international certificate authority, and often only uses single-key, single-certificate, and single-platform authentication, only suitable for centralized cloud deployment. With security concerns, the conventional root server is inconvenient for the government, enterprises, families, and individuals.

Therefore, it is urgent for those skilled in the art to develop a root server (i.e. a root system) and a method therefor which can effectively solve the problems of security concerns and operational inconvenience, creating an integrated platform from credit verification, credit augmentation, credit solicitation to credibility, and realizing the whole life cycle management of digital assets of governments, enterprises, families and individuals.

It is to be noted that the foregoing description of the technical background has been presented only to facilitate a clear and complete description of the technical solution of the present disclosure and to facilitate an understanding by those skilled in the art. These solutions are not considered to be known to those skilled in the art merely because the solutions are described in the background of the present disclosure.

SUMMARY

To overcome the deficiencies in the prior art, examples of the present disclosure provide an internet protocol version 6 (IPv6)-based multi-element authentication root system and a method therefor.

The examples of the present disclosure provide an IPv6-based multi-element authentication root system, including a first acquisition module, configured to acquire a plurality of pieces of identity information, a plurality of pieces of enterprise information and an enterprise code of a user; a second acquisition module, configured to acquire an IPv6 digital address of the user, the IPv6 digital address including a plurality of sets of sixteen-bit address fragments; a third acquisition module, configured to acquire a plurality of digital certificates and a plurality of corresponding keys provided by a plurality of certificate authorities; an information authentication module, configured to perform entity or digital authentication on the plurality of pieces of identity information and the plurality of pieces of enterprise information of the user according to the plurality of sets of sixteen-bit address fragments of the IPv6 digital address, and generate a plurality of pieces of authenticated identity information and a plurality of pieces of authenticated enterprise information; an electronic private seal/common seal generation module, configured to generate an electronic private seal and an electronic common seal of the user according to the plurality of pieces of authenticated identity information and the plurality of pieces of authenticated enterprise information; and a root certificate issuing module, configured to link the plurality of certificate authorities via the third acquisition module when the user issues a root certificate issuing request, perform multi-key verification on the plurality of pieces of authenticated identity information and the plurality of pieces of authenticated enterprise information according to the plurality of digital certificates and the plurality of corresponding keys, and issue a plurality of root certificates.

Further, the electronic private seal is a printed electronic private seal or a handwritten electronic private seal, and alternatively, the electronic private seal also needs a handwritten signature.

Further, the root system includes a binding module, configured to bind the enterprise code to the IPv6 digital address, and generate an IPv6-based domain name.

Further, the enterprise code is bound to a fixed-line telephone number, and the fixed-line telephone number is a digital application conforming to a global financial security level.

Further, the IPv6-based multi-element authentication root system is a certificate-key chain operating system for global digital applications.

Further, the root system includes a stroke digitizing module, configured to convert each Chinese character in the plurality of pieces of identity information into a set of digital codes according to a stroke digital code table.

Further, the root system includes a multi-module. The multi-module includes a central control module, and a communication module, an identity authentication module, a key module and a storage module connected to the central control module. The communication module is configured to realize a communication between the IPv6-based multi-element authentication root system and an external server; the identity authentication module is configured to authenticate biological identification data inputted by the user to generate authenticated biological identification data, and authorize the user after the authentication is passed; the key module is configured to store the plurality of keys, and encrypt the plurality of pieces of authenticated identity information and the plurality of pieces of authenticated enterprise information according to corresponding keys in the plurality of keys to generate a plurality of pieces of encrypted authenticated identity information and a plurality of pieces of encrypted authenticated enterprise information; the storage module is configured to store the authenticated biological identification data, the plurality of pieces of encrypted authenticated identity information, the plurality of pieces of encrypted authenticated enterprise information, the electronic private seal, the electronic common seal and the plurality of root certificates; and the central control module is configured to receive an input and control operations of other modules, and allow the user after being authorized to invoke the electronic private seal and the electronic common seal.

The examples of the present disclosure also provide an IPv6-based multi-element root authentication method, and the method includes the following steps: providing an IPv6-based multi-element authentication root system, the IPv6-based multi-element authentication root system including a first acquisition module, a second acquisition module, a third acquisition module, an information authentication module, an electronic private seal/common seal generation module and a root certificate issuing module; using the first acquisition module to acquire a plurality of pieces of identity information, a plurality of pieces of enterprise information and an enterprise code of a user; using the second acquisition module to acquire an IPv6 digital address of the user, the IPv6 digital address including a plurality of sets of sixteen-bit address fragments; using the third acquisition module to acquire a plurality of digital certificates and a plurality of corresponding keys provided by a plurality of certificate authorities; using the information authentication module to perform entity or digital authentication on the plurality of pieces of identity information and the plurality of pieces of enterprise information of the user according to the plurality of sets of sixteen-bit address fragments of the IPv6 digital address, and generate a plurality of pieces of authenticated identity information and a plurality of pieces of authenticated enterprise information; using the electronic private seal/common seal generation module to generate an electronic private seal and an electronic common seal of the user according to the plurality of pieces of authenticated identity information and the plurality of pieces of authenticated enterprise information of the user; and using the root certificate issuing module to link the plurality of certificate authorities via the third acquisition module when the user issues a root certificate issuing request, perform multi-key verification on the plurality of pieces of authenticated identity information and the plurality of pieces of authenticated enterprise information according to the plurality of digital certificates and the plurality of corresponding keys, and issue a plurality of root certificates.

The present disclosure has the following advantageous effects according to the above technical solutions. Compared with the prior art, the IPv6-based multi-element authentication root system and a method therefor provided by the present disclosure include the following advantages. (1) On the basis of the IPv6 protocol, by intensifying a plurality of trusted elements to a certificate authority to digitally authenticate an equally secure certificate, the system of the present disclosure can not only realize dual-stack interworking between the IPv6 and the IPv4, but also realize multi-category interworking and mutual recognition of digital authentication of all the certificate authorities and national electronic seal authentication. (2) Multi-certificate and multi-key application and issuance can be completed in one authentication on a single platform, and can be written into a variety of safest storage medium devices. (3) Through the certificate-key chain management, the authentication and storage of multiple elements and multiple certificates for the entity from "birth" is innovatively completed, and the operation mode of one-master and multiple-slave, one-account with multiple keys for distribution is established through one-number multi-purpose. (4) The digital authentication of the present disclosure is independent of the authentication system of international certificate authority and is safe and reliable. In addition, the IPv6-based multi-element authentication root system and a method therefor of the present disclosure can also convert each Chinese character into a set of digital codes D_Code through a stroke digital code table, making the Chinese character readable by a computer, further sinicizing the written code language from the bottom, so that the written code language is no longer limited to English. In other words, the IPv6-based multi-element authentication root system of the present disclosure is a digital trust service facility with China's own intellectual property rights, which is based on a new generation of IPv6 digital address authentication, and at the same time, with the intensive enterprise and individual global multi-element authentication as the core, integrates authentication mutual trust services from domestic and international certificate authorities, to form a unified, intensive, multi-key, and multi-element solid foundation for enterprise and individual credit systems.

To make the above and other objectives, features and advantages of the present disclosure more obvious and easy to understand, preferred examples are provided in the following with reference to the accompanying drawings.

BRIEF DESCRIPTION OF THE DRAWINGS

To explain the technical solutions of examples in the present disclosure or in the prior art more clearly, the accompanying drawings required in the description of the examples or the prior art are introduced briefly below. Obviously, the drawings in the following description are only some examples of the present disclosure, and other drawings can be obtained according to these drawings without creative efforts for those ordinary skilled in the art.

FIG. 4 is a schematic diagram of one example of a stroke digital code table of the present disclosure.

FIG. 5 is a frame diagram of a multi-module in FIGS. 1, 2 and 3.

REFERENCE NUMERALS AND DENOTATIONS THEREOF

10A, 10B and 10C—IPv6-based multi-element authentication root system
110—First acquisition module
120—Second acquisition module
130—Third acquisition module
140—Information authentication module
150—Electronic private seal/common seal generation module
160—Root certificate issuing module
170—Binding module
180—Stroke digitizing module
200—Multi-module
30A-30N—Certificate authority
210—Central control module
220—Communication module
230—Identity authentication module
240—Key module
250—Storage module
ID1-IDn—Identity information
aID1-aIDn—Authenticated identity information eaID1-eaIDn—Encrypted authenticated identity information
CI1-CIm—Enterprise information
aCI1-aCIm—Authenticated enterprise information
eaCI1-eaCIm—Encrypted authenticated enterprise information
Code_E—Enterprise code
IPv6_ADD—IPv6-Digital address
Add_S1-ADD_Sq—16-bit address fragment
CAC1-CACp—Digital certificate
KEY1-KEYp—Key
EPS—Electronic private seal
ECS—Electronic common seal
REQ—Root certificate issue request
ROOT_C1-ROOT_Cq—Root certificate
ROOT DN—Domain name
D_Code—Digital code
BID—Biological identification data
aBID—Authenticated biological identification data
S610-S670 and S710-S760—Step

DETAILED DESCRIPTION

Technical solutions in the examples of the present disclosure will be described clearly and completely in the following with reference to the accompanying drawings in the examples of the present disclosure. Obviously, all the described examples are only some, rather than all examples of the present disclosure. On the basis of the examples in the present disclosure, all other examples obtained by those ordinary skilled in the art without creative efforts belong to the scope of protection of the present disclosure.

It is to be noted that in the description of the present disclosure, the terms "first", "second", and the like are only used for describing objectives and distinguishing similar objects, there is no precedence between the two, and no indication or suggestion of relative importance is made. Further, in the description of the present disclosure, unless otherwise specified, the meaning of "plurality" means two or more.

Figure 1:
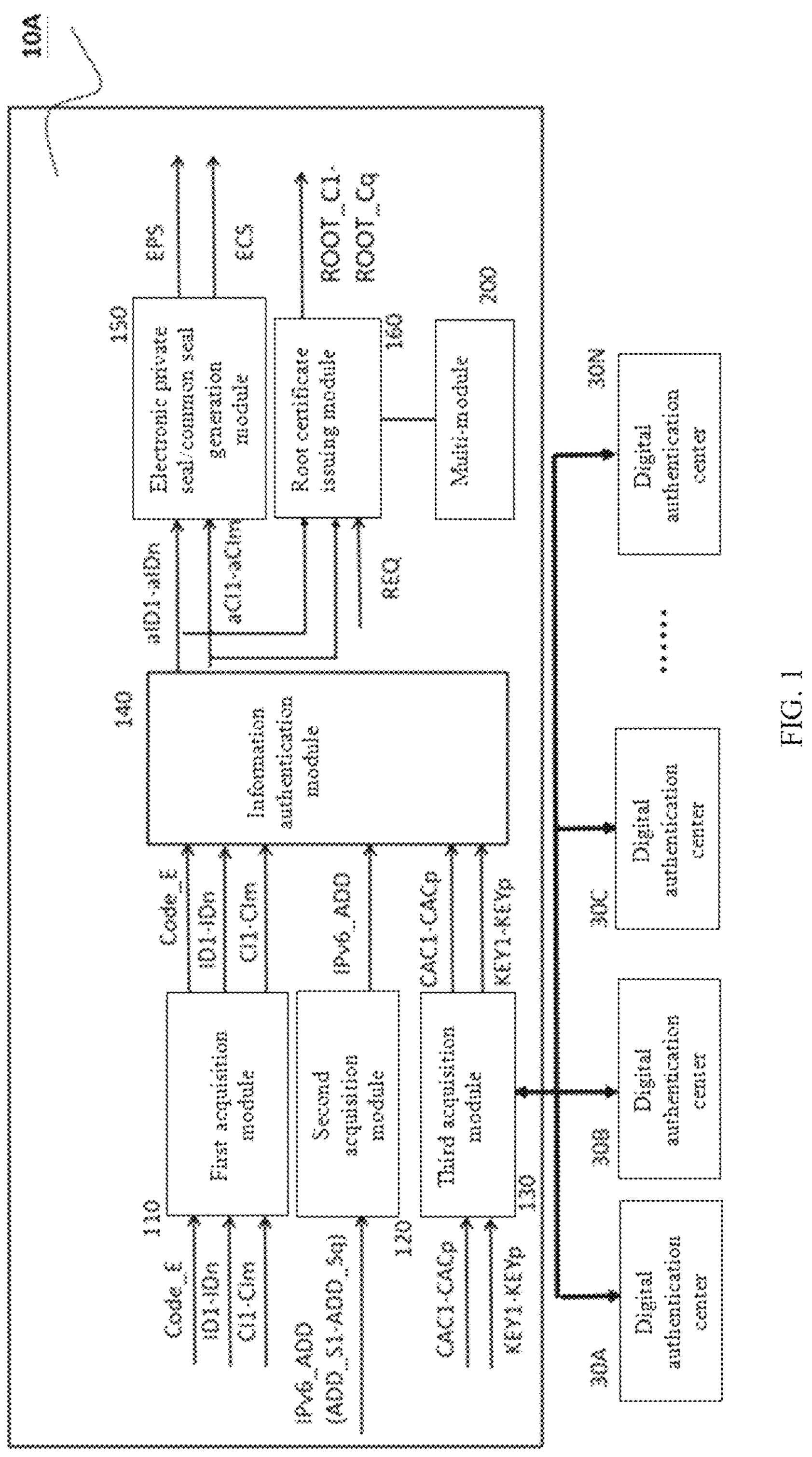
FIG. 1 is a framework diagram of an IPv6-based multi-element authentication root system in a first example of the present disclosure.

Referring to FIG. 1, which is a framework diagram of an IPv6-based multi-element authentication root system 10A in a first example of the present disclosure. As shown in FIG. 1, the IPv6-based multi-element authentication root system 10A includes a first acquisition module 110, a second acquisition module 120, a third acquisition module 130, an information authentication module 140, an electronic private seal/common seal generation module 150, a root certificate issuing module 160 and a multi-module 200. The first acquisition module 110 is configured to acquire a plurality of pieces of identity information ID1-IDn, a plurality of pieces of enterprise information CI1-CIm and an enterprise code Code_E of a user. The second acquisition module 120 is configured to acquire an IPv6 digital address IPv6_ADD of the user, and the IPv6 digital address IPv6_ADD includes a plurality of sets of sixteen-bit address fragments ADD_S1-ADD_Sq. The third acquisition module 130 is configured to acquire a plurality of digital certificates CAC1-CACp and a plurality of corresponding keys KEY1-KEYp provided by a plurality of certificate authorities 30A-30N. The information authentication module 140 is coupled to the first acquisition module 110, the second acquisition module 120 and the third acquisition module 130, and is configured to perform entity or digital authentication on the plurality of pieces of identity information ID1-IDn and the plurality of pieces of enterprise information CI1-CIm of the user according to the plurality of sets of sixteen-bit address fragments ADD_S1-ADD_Sq of the IPv6 digital address IPv6_ADD, and generate a plurality of pieces of authenticated identity information aID1-aIDn and a plurality of pieces of authenticated enterprise information aCI1-aCIm. The electronic private seal/common seal generation module 150 is coupled to the information authentication module 140, and is configured to generate an electronic private seal EPS and an electronic common seal ECS of the user according to the plurality of pieces of authenticated identity information aID1-aIDn and the plurality of pieces of authenticated enterprise information aCI1-aCIm of the user. The root certificate issuing module 160 is coupled to the information authentication module 140, and is configured to link the plurality of certificate authorities 30A-30N via the third acquisition module when the user issues a root certificate issuing request REQ, perform multi-key verification on the plurality of pieces of authenticated identity information aID1-aIDn and the plurality of pieces of authenticated enterprise information aCI1-aCIm according to the plurality of digital certificates CAC1-CACp and the plurality of corresponding keys KEY1-KEYp, and issue a plurality of root certificates ROOT_C1-ROOT_Cq.

It is to be noted that the plurality of pieces of identity information ID1-IDn may include an identity card, a bank account, an address, an email address, a bound mobile phone number, a bound fixed-line telephone number, a WeChat account, an Alipay account, a JingDong account, a Pinduoduo account, a microblog account, a QQ account, a Tik Tok account, a live broadcast room number and/or a video number of a founder of a user's company. The plurality of pieces of enterprise information CI1-CIm may include a bound fixed-line telephone number, a bound bank account, an electronic business license, tax control information, a common seal number, a legal person certificate number, a unified social credit code, an electronic license number, an enterprise Wechat account, a live room number, and/or a video number of an enterprise user authorized by a bank system and/or a government system. However, it is only for illustration, and the present disclosure is not limited thereto.

The electronic private seal is a printed electronic private seal or a handwritten electronic private seal, and alternatively, the electronic private seal also needs a handwritten signature.

It is to be noted that the enterprise code Code E is bound to a fixed-line telephone number, and the fixed-line telephone number is a digital application conforming to a global financial security level. Therefore, the IPv6-based multi-element authentication root system 10A/10B/10C of the present disclosure is a certificate-key chain operating system for global digital applications.

Figure 2:
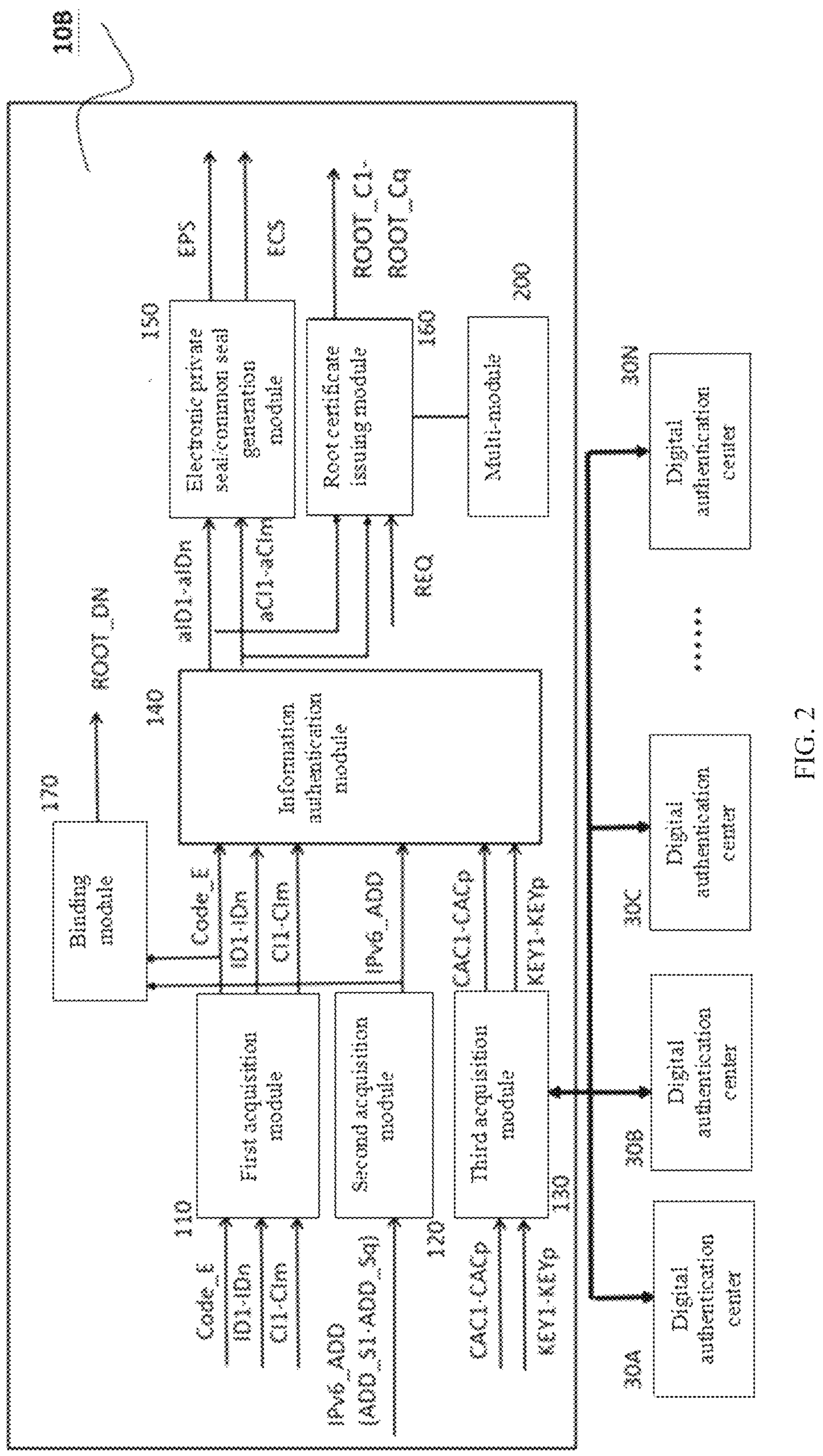
FIG. 2 is a framework diagram of the IPv6-based multi-element authentication root system in a second example of the present disclosure.

Referring to FIG. 2, which is a block diagram of an IPv6-based multi-element authentication root system 10B in a second example of the present disclosure. The architecture of the IPv6-based multi-element authentication root system 10B of FIG. 2 is similar to that of the IPv6-based multi-element authentication root system 10A of FIG. 1, with the difference that the IPv6-based multi-element authentication root system 10B of FIG. 2 further includes a binding module 170, coupled to the first acquisition module 110 and the second acquisition module 120, and configured to bind the enterprise code Code_E to the IPv6 digital address IPv6_ADD and generate an IPv6-based domain name ROOT DN.

The IPv6-based domain name ROOT_DN may be a domain name defined based on an IPv6 protocol, for example: end with the Chinese-based root domain name ". ipv6" to distinguish from existing overseas-based root domain names ". com", ". net", etc. The IPv6-based domain name ROOT_DN can be generated after binding the enterprise code Code_E to the IPv6 digital address IPv6_ADD, such as "059188881234. ipv6", and "059188881234. cn. ipv6".

Figure 3:
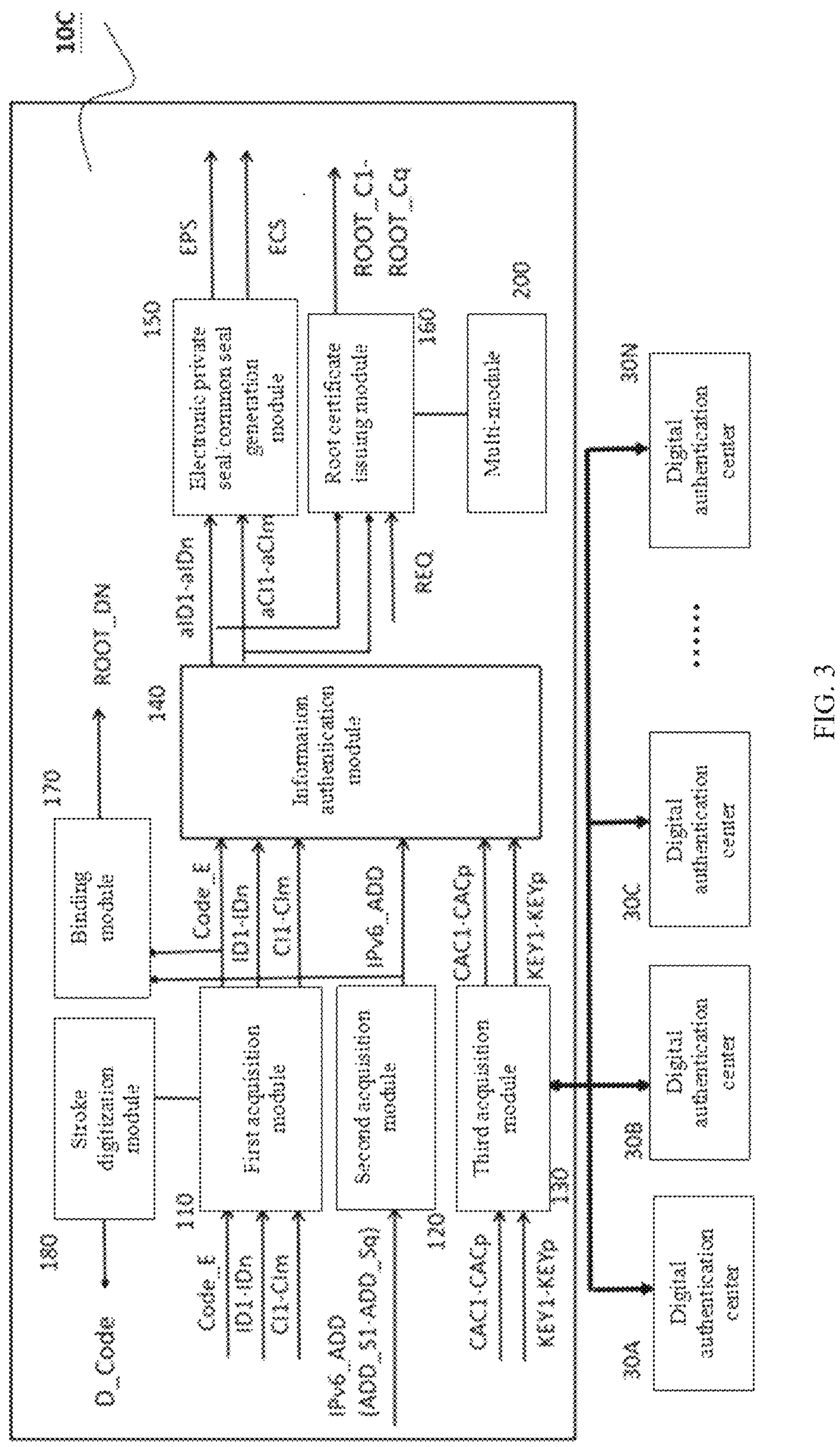
FIG. 3 is a framework diagram of the IPv6-based multi-element authentication root system in a third example of the present disclosure.

Referring to FIG. 3, which is the IPv6-based multi-element authentication root system 10C in a third example of the present disclosure. The architecture of the IPv6-based multi-element authentication root system 10C of FIG. 3 is similar to that of the IPv6-based multi-element authentication root system 10B of FIG. 2, with the difference that the IPv6-based multi-element authentication root system 10C of FIG. 3 further includes a stroke digitizing module 180, coupled to the first acquisition module 110, and configured to convert each Chinese character in the plurality of pieces of identity information ID1-IDn into a set of digital codes D_Code according to a stroke digital code table.

Referring to FIG. 4, which is a schematic diagram of one example of the stroke numeric code table of the present disclosure. Strokes generally refer to uninterrupted points and lines of various shapes that constitute Chinese characters, including horizontal stroke (一), vertical stroke (丨), left-falling stroke (丿), dot (丶), and right-falling stroke, etc. Strokes are the smallest continuous units that constitute Chinese character glyphs. Referring to FIG. 4, which collates common Chinese character strokes and the corresponding digital code D_Code, with a total of thirty-two strokes. For example, the digital code D_Code corresponding to the horizontal stroke (一) is "01", the digital code D_Code corresponding to the vertical stroke (丨) is "02", the digital code D_Code corresponding to the left-falling stroke (丿) is "03", . . . , and the digital code D_Code corresponding to horizontal and redoubled turning with a hook to the left is "32", and so on. Thus, the stroke digitizing module 180 converts each Chinese character of the plurality of pieces of identity information ID1-IDn into a set of digital codes D_Code according to the stroke digital code table of FIG. 4. For example, the identity information includes name information, such as "古今". "古" can be sequentially disassembled into five strokes according to the writing order: horizontal stroke (一), left-falling stroke (丿), vertical stroke (丨) and horizontal turning stroke, and horizontal stroke (一). Therefore, the digital code D_Code for "古" after conversion is (01, 03, 02, 09, 01). "今" can be sequentially disassembled into four strokes according to the writing order: left-falling stroke (丿), right-falling stroke, dot (丶), and left horizontal falling stroke, and the digital code D_Code for "今" after conversion is (03, 05, 04, 07). Alternatively, the D_Code may include a sequence code at an end to distinguish characters with the same strokes and same writing order. For example, "土" can be sequentially disassembled into three strokes according to the writing order: horizontal stroke (一), vertical stroke (丨) and horizontal stroke ( . ), and the digital code D_Code for "土" after conversion is (01, 02, 01, 1), with "1" at the end of the digital code D_Code being a sequence code. "士" can be sequentially disassembled into three strokes according to the writing order: horizontal stroke (一), vertical stroke (丨) and horizontal stroke ( . ), and the digital code D Code for "士" after conversion is (01, 02, 01, 2), with "2" at the end of the digital code D_Code being a sequence code.

It is to be noted that in certain cases, the third acquisition module 130 described above may also be omitted, and the function thereof may be replaced by the second acquisition module 120. In other words, the IPv6-based multi-element authentication root system 10A/10B/10C of the present disclosure can perform authentication using the IPv6 digital address IPv6_ADD instead of the digital certificate, the stroke digitizing module 180 can convert each Chinese character into a set of digital codes D_Code through the stroke digital code table as shown in FIG. 4, making the Chinese character readable by the computer, and further sinicizing the written code language from the bottom.

Referring to FIGS. 1-3 and 5 together, the IPv6-based multi-element authentication root system 10A/10B/10C of FIGS. 1-3 further includes a multi-module 200. As shown in FIG. 5, the multi-module 200 includes a central control module 210, and a communication module 220, an identity authentication module 230, a key module 240, and a storage module 250 connected to the central control module 210. The communication module 220 is configured to realize a communication between the IPv6-based multi-element authentication root system 10A/10B/10C and an external server. The identity authentication module 230 is configured to authenticate biological identification data BID inputted by the user to generate authenticated biological identification data aBID, and authorize the user after the authentication is passed. The key module 240 is configured to store a plurality of keys KEY1-KEYp and encrypt the plurality of pieces of authenticated identity information aID1-aIDn and the plurality of pieces of authenticated enterprise information aCI1-aCIm according to corresponding keys in the plurality of keys KEY1-KEYp to generate a plurality of pieces of encrypted authenticated identity information eaID1-eaIDn and a plurality of pieces of encrypted authenticated enterprise information eaCI1-eaCIm. The storage module 250 is configured to store the authenticated biological identification data aBID, the plurality of pieces of encrypted authenticated identity information eaID1-eaIDn, the plurality of pieces of encrypted authenticated enterprise information eaCI1-eaCIm, the electronic private seal EPS, the electronic common seal ECS and the plurality of root certificates ROOT_C1-ROOT_Cq. The central control module 210 is configured to receive an input and control the operations of other modules 220-250, and allow the user after being authorized to invoke the electronic private seal EPS and the electronic common seal ECS.

Generally, the above-mentioned electronic private seal refers to a digital image having a seal and a stamp after being authorized and authenticated, and an electronic signature is a handwritten signature on a touch screen, a handwriting board, a computer, a tablet or a mobile phone.

In addition, whether in Chinese, English or other languages, the surname and given name can be separated into individual word or character of the minimum unit for authentication and authorization applications, that is, a complete name cannot be signed through a single platform in the present disclosure. For example, "古今米" requires three different platforms to authenticate and authorize "古", "今" and "米", respectively. In addition, the electronic private seal/electronic signature after being authenticated and authorized needs to be bound to a mobile phone number and/or email address for integrated use.

Further, the communication module 220 may include at least one of a 3G communication module, a 4G communication module, a 5G communication module, a wireless fidelity (WIFI) module, a narrow band internet of things (NBIoT) module, a bluetooth module, a near field communication (NFC) module and an infrared module. The communication module 220 supports the IPv4 and IPv6 protocols.

It is to be noted that the electronic private seal EPS herein can be a cross-domain electronic private seal or a cross-domain electronic signature or the two, the electronic private seal is a printed electronic private seal or a handwritten electronic private seal, the language of the electronic private seal can be languages of all countries in the world, and the corresponding number is a bound mobile phone number. Alternatively, the electronic private seal also needs a handwritten electronic signature, and the language of the electronic signature can be languages of all countries in the world, and the corresponding number is a bound mobile phone number.

It is to be noted that the above-mentioned biological identification data BID may include fingerprint information data, palm print information data, iris information data, facial feature identification data, voice print information data and/or electrocardiogram data, or any biological identification data that can identify the user. In practical applications, one or a combination of the biological identification data can be used for security identification. In addition, in the process of authentication using biological feature data BID, physical features and behavioral features are to be paid attention to. The physiological features include fingerprint, palmprint, palm type, iris, face, voice print, DNA, etc. The behavioral features include gesture, heartbeat, signature, etc.

It is worth noting that the IPv6-based multi-element authentication root system of the present disclosure is not only an IPv6-based multi-element authentication root server, but also a digital server based on a Chinese stroke writing application. On the basis of the IPv6 protocol, by intensifying a plurality of trusted elements to a digital authentication certificate with the same security, an integrated certification system of the present disclosure can not only realize dual-stack intercommunication between the IPv6 and the IPv4, but also realize multi-category intercommunication and mutual recognition of all digital authentications and national electronic seal authentications. Furthermore, the digital authentication of the present disclosure is independent of the authentication system of international certificate authority and is safe and reliable. In addition, each Chinese character is converted into a set of digital codes D_Code by the stroke digital code table as shown in FIG. 4, making the Chinese character readable by the computer, and further sinicizing the written code language from the bottom, so that the written code language is no longer limited to English. In other words, the IPv6-based multi-element authentication root system of the present disclosure is a digital trust service facility with China's own intellectual property rights, which is based on a new generation of IPv6 digital address authentication, and at the same time, with an intensive enterprise and individual global multi-element authentication as the core, integrates domestic and international digital authentication mutual trust services, to form a unified, intensive, multi-key, and multi-element solid foundation for enterprise and individual credit systems.

It is to be also noted that for any unit or institution other than an individual, the IPv6-based multi-element authentication root system of the present disclosure uses a bound fixed-line telephone number as a unique numerical sign, and each element of the data carries the fixed-line telephone number as an important authentication element; and for individuals and families, the IPv6-based multi-element authentication root system of the present disclosure needs to match with and bind to mobile phone numbers authenticated by real names.

The IPv6-based multi-element authentication root system of the present disclosure can be a trusted authentication server system, or a third-party authentication platform system. The terminal device includes the authentication, storage, management and application of various certificate keys including electronic seals, and corresponds to any department or platform system for socio-economic transactions, including a government, an enterprise, an individual and a family.

The IPv6-based multi-element authentication root system of the present disclosure can be realized by a chip of an integrated physical-electronic intelligent electronic seal, the chip of the integrated physical-electronic intelligent electronic seal stores various certificates and keys, and all the certificates and keys can be distributed, downloaded, stored and applied remotely.

Figure 6:
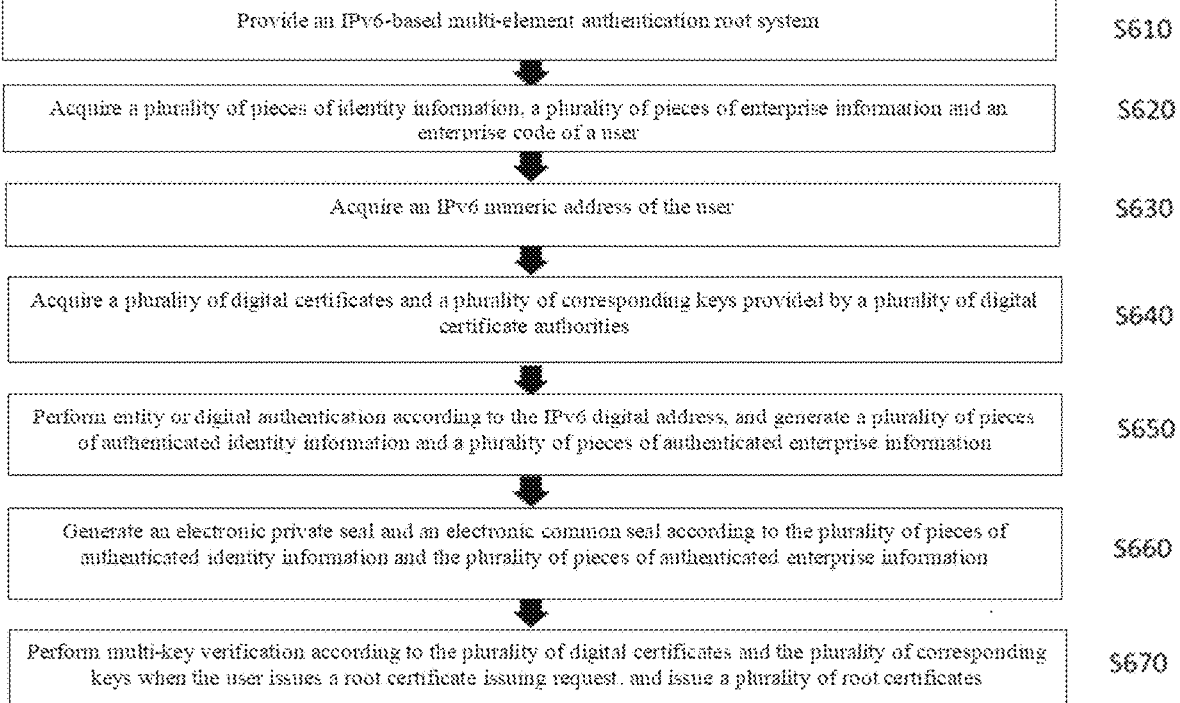
FIG. 6 is a flowchart of an IPv6-based multi-element root authentication method in the first example of the present disclosure.

Referring to FIGS. 1 and 6 together, FIG. 6 is a flowchart of an IPv6-based multi-element root authentication method in the first example of the present disclosure. The IPv6-based multi-element root authentication method in FIG. 6 includes the following steps.

Step S610: an IPv6-based multi-element authentication root system is provided, including a first acquisition module, a second acquisition module, a third acquisition module, an information authentication module, an electronic private seal/common seal generation module and a root certificate issuing module.

Step S620: a plurality of pieces of identity information, a plurality of pieces of enterprise information and an enterprise code of a user are acquired using the first acquisition module.

Step S630: an IPv6 digital address of the user is acquired using the second acquisition module, and the IPv6 digital address includes a plurality of sets of sixteen-bit address fragments.

Step S640: a plurality of digital certificates and a plurality of corresponding keys provided by a plurality of certificate authorities are acquired using the third acquisition module.

Step S650: using the information authentication module, entity or digital authentication is performed on the plurality of pieces of identity information and the plurality of pieces of enterprise information of the user according to the plurality of sets of sixteen-bit address fragments of the IPv6 digital address, and a plurality of pieces of authenticated identity information and a plurality of pieces of authenticated enterprise information are generated.

Step S660: an electronic private seal and an electronic common seal of the user are generated according to the plurality of pieces of authenticated identity information and the plurality of pieces of authenticated enterprise information of the user using the electronic private seal/common seal generation module.

Step S670: using the root certificate issuing module, the plurality of certificate authorities are linked via the third acquisition module when the user issues a root certificate issuing request, multi-key verification is performed on the plurality of pieces of authenticated identity information and the plurality of pieces of authenticated enterprise information according to the plurality of digital certificates and the plurality of corresponding keys, and a plurality of root certificates are issued.

It is to be noted that step S620 is performed by the first acquisition module 110, step S630 is performed by the second acquisition module 120, step S640 is performed by the third acquisition module 130, step S650 is performed by the information authentication module 140, step S660 is performed by the electronic private seal/common seal generation module 150, and step S670 is performed by the root certificate issuing module 160.

Figure 7:
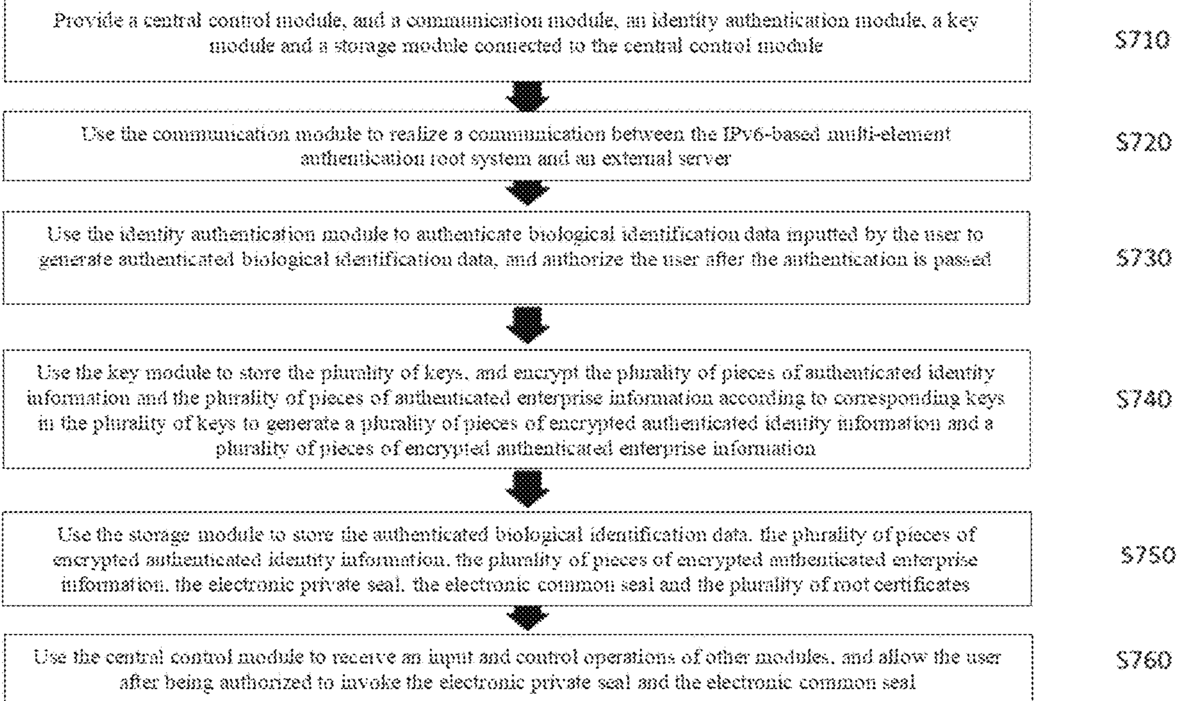
FIG. 7 is a flowchart of the IPv6-based multi-element root authentication method in the second example of the present disclosure.

Referring to FIGS. 5 and 7 together, FIG. 7 is a flowchart of the IPv6-based multi-element root authentication method according to the second example of the present disclosure. The IPv6-based multi-element root authentication method in FIG. 7 includes the following steps.

Step S710: a central control module, and a communication module, an identity authentication module, a key module and a storage module connected to the central control module are provided.

Step S720: a communication between the IPv6-based multi-element authentication root system and the external server is realized using the communication module.

Step S730: using the identity authentication module, biological identification data inputted by the user is authenticated to generate authenticated biological identification data, and the user is authorized after the authentication is passed.

Step S740: using the key module, the plurality of keys are stored, and the plurality of pieces of authenticated identity information and the plurality of pieces of authenticated enterprise information are encrypted according to corresponding keys in the plurality of keys to generate a plurality of pieces of encrypted authenticated identity information and a plurality of pieces of encrypted authenticated enterprise information.

Step S750: the authenticated biological identification data, the plurality of pieces of encrypted authenticated identity information, the plurality of pieces of encrypted authenticated enterprise information, the electronic private seal, the electronic common seal and the plurality of root certificates are stored using the storage module.

Step S760: using the central control module, an input is received and operations of other modules are controlled, and the user after being authorized is allowed to invoke the electronic private seal and the electronic common seal.

It is to be noted that step S720 is performed by the communication module 220, step S730 is performed by the identity authentication module 230, step S740 is performed by the key module 240, step S750 is performed by the storage module 250, and step S760 is performed by the central control module 210.

The specific examples of the present disclosure provide an IPv6-based multi-element authentication root system and a method therefor, which can issue the root certificate with multiple certificates, multiple keys, multiple elements and multiple platforms. Therefore, the present disclosure can effectively solve the problems of security concerns, inconvenient operation and so on, compared with the conventional root system supporting only a single certificate, a single key, a single element and a single platform. Furthermore, the IPv6-based multi-element authentication root system of the present disclosure performs privatized deployment using an integrated physical-electronic application, and each intelligent terminal is an edge cloud with integrated computing power and storage. The intelligent terminal includes a certificate collecting and soliciting server, an intelligent seal, a certificate collecting and soliciting set-top box, a certificate collecting and soliciting router, and a certificate collecting and soliciting U-shield, etc. Therefore, the security problem of centralized deployment of private key can be solved. In addition, the IPv6-based multi-element authentication root system of the present disclosure binds to the fixed-line telephone number and/or the mobile phone number, realizing one number with multi-purpose to expand digital space, creating an integrated platform from certification, credit augmentation and credit solicitation to credibility, and realizing the whole life cycle management of digital assets of governments, enterprises, families and individuals.

The examples of the present disclosure described above may be implemented in various forms of hardware, software, or combinations of the two. For example, the examples of the present disclosure may also be program codes for executing the above-described method in a digital signal processor (DSP). The present disclosure may also relate to various functions performed by a computer processor, the DSP, a microprocessor or a field programmable gate array (FPGA). The processor described above may be configured in accordance with the present disclosure to perform certain tasks by executing machine-readable software code or firmware code that define certain methods provided herein. The software code or firmware code may be developed in different programming languages and in different formats or forms. The software code may also be compiled for different target platforms. However, different code styles, types and languages of the software code and other types of configuration code that perform tasks according to the present disclosure do not deviate from the spirit and scope of the present disclosure.

The present disclosure has the following advantageous effects according to the above technical solutions. Compared with the prior art, IPv6-based multi-element authentication root system and a method therefor provided by the present disclosure include the following advantages. (1) On the basis of the IPv6 protocol, by intensifying a plurality of trusted elements to a certificate authority to digitally authenticate an equally secure certificate, the system of the present disclosure can not only realize dual-stack interworking between the IPv6 and the IPv4, but also realize multi-category interworking and mutual recognition of digital authentication of all the certificate authorities and national electronic seal authentication. (2) Multi-certificate and multi-key application and signing can be completed in one authentication on a single platform, and can be written into a variety of safest storage medium devices. (3) Through the certificate-key chain management, the authentication and storage of multiple elements and multiple certificates for the entity from the beginning of "birth" is innovatively completed, and the operation mode of one-master and multiple-slave, one-account with multiple keys for distribution is established through one-number multi-purpose. (4) The digital authentication of the present disclosure is independent of the authentication system of international certificate authority and is safe and reliable. In addition, the IPv6-based multi-element authentication root system and a method therefor of the present disclosure can also convert each Chinese character into a set of digital codes D_Code through the stroke digital code table, making the Chinese character readable by the computer, and further sinicizing the written code language from the bottom, so that the written code language is no longer limited to English. In other words, the IPv6-based multi-element authentication root system of the present disclosure is a digital trust service facility with China's own intellectual property rights, which is based on a new generation of IPv6 digital address authentication, and at the same time, with the intensive enterprise and individual global multi-element authentication as the core, integrates authentication mutual trust services from domestic and international certificate authorities, to form a unified, intensive, multi-key, and multi-element solid foundation for enterprise and individual credit systems.

While the principle and embodiments of the present disclosure has been described with reference to specific examples, the description of the above examples has been presented only to aid in the understanding of the method and core ideas of the present disclosure. Changes may be made in the specific embodiments and applications of the present disclosure by those skilled in the art according to the ideas of the present disclosure. In summary, the contents of this specification are not to be construed as limiting the present disclosure.

The invention claimed is:

1. An internet protocol version 6 (IPv6)-based multi-element authentication root system, comprising:

a first acquisition module, configured to acquire a plurality of pieces of identity information, a plurality of pieces of enterprise information and an enterprise code of a user, wherein the plurality of pieces of identity information comprise Chinese characters;

a second acquisition module, configured to acquire an IPV6 digital address of the user, the IPV6 digital address comprising a plurality of sets of sixteen-bit address fragments;

a third acquisition module, configured to acquire a plurality of digital certificates and a plurality of corresponding keys provided by a plurality of certificate authorities;

an information authentication module, coupled to the first acquisition module, the second acquisition module and the third acquisition module, and configured to perform entity or digital authentication on the plurality of pieces of identity information and the plurality of pieces of enterprise information of the user according to the plurality of sets of sixteen-bit address fragments of the IPV6 digital address, and generate a plurality of pieces of authenticated identity information and a plurality of pieces of authenticated enterprise information;

a generation module, coupled to the information authentication module, and configured to generate an electronic private seal and an electronic common seal of the user according to the plurality of pieces of authenticated identity information and the plurality of pieces of authenticated enterprise information; and a root certificate issuing module, coupled to the information authentication module, and configured to link the plurality of certificate authorities via the third acquisition module when the user issues a root certificate issuing request, perform multi-key verification on the plurality of pieces of authenticated identity information and the plurality of pieces of authenticated enterprise information according to the plurality of digital certificates and the plurality of corresponding keys, and issue a plurality of root certificates.

2. The IPV6-based multi-element authentication root system according to claim 1, further comprising:

a binding module, coupled to the first acquisition module and the second acquisition module, and configured to bind the enterprise code to the IPV6 digital address, and generate an IPv6-based domain name.

3. The IPV6-based multi-element authentication root system according to claim 1, further comprising:

a stroke digitizing module, coupled to the first acquisition module, and configured to convert each of the Chinese characters in the plurality of pieces of identity information into a set of digital codes according to a stroke digital code table.

4. The IPV6-based multi-element authentication root system according to claim 1, further comprising a multi-module, coupled to the root certificate issuing module, wherein the multi-module comprises a central control module, and a communication module, an identity authentication module, a key module and a storage module connected to the central control module;

the communication module being configured to realize a communication between the IPV6-based multi-element authentication root system and an external server;

the identity authentication module being configured to authenticate biological identification data inputted by the user to generate authenticated biological identification data, and authorize the user after the authentication is passed;

the key module being configured to store the plurality of keys, and encrypt the plurality of pieces of authenticated identity information and the plurality of pieces of authenticated enterprise information according to corresponding keys in the plurality of keys to generate a plurality of pieces of encrypted authenticated identity information and a plurality of pieces of encrypted authenticated enterprise information;

the storage module being configured to store the authenticated biological identification data, the plurality of pieces of encrypted authenticated identity information, the plurality of pieces of encrypted authenticated enterprise information, the electronic private seal, the electronic common seal and the plurality of root certificates; and the central control module being configured to receive an input and control operations of other modules, and allow the user to invoke the electronic private seal and the electronic common seal after the user is authorized.

5. The IPV6-based multi-element authentication root system according to claim 1, wherein the enterprise code is bound to a fixed-line telephone number, and the fixed-line telephone number is a digital application conforming to a global financial security level.

6. The IPv6-based multi-element authentication root system according to claim 1, wherein the IPV6-based multi-element authentication root system is a certificate-key chain operating system for global digital applications.

7. The IPV6-based multi-element authentication root system according to claim 1, wherein both the electronic private seal and a handwritten signature are needed when stamping is performed.

8. An internet protocol version 6 (IPv6)-based multi-element root authentication method, applied to an IPV6-based multi-element authentication root system, and comprising the following steps:

providing the IPV6-based multi-element authentication root system, the IPV6-based multi-element authentication root system comprising a first acquisition module, a second acquisition module, a third acquisition module, an information authentication module, a generation module and a root certificate issuing module;

using the first acquisition module to acquire a plurality of pieces of identity information, a plurality of pieces of enterprise information and an enterprise code of a user, wherein the plurality of pieces of identity information comprise Chinese characters;

using the second acquisition module to acquire an IPV6 digital address of the user, the IPV6 digital address comprising a plurality of sets of sixteen-bit address fragments;

using the third acquisition module to acquire a plurality of digital certificates and a plurality of corresponding keys provided by a plurality of certificate authorities;

using the information authentication module to perform entity or digital authentication on the plurality of pieces of identity information and the plurality of pieces of enterprise information of the user according to the plurality of sets of sixteen-bit address fragments of the IPV6 digital address, and generate a plurality of pieces of authenticated identity information and a plurality of pieces of authenticated enterprise information;

using the generation module to generate an electronic private seal and an electronic common seal of the user according to the plurality of pieces of authenticated identity information and the plurality of pieces of authenticated enterprise information of the user; and using the root certificate issuing module to link the plurality of certificate authorities via the third acquisition module when the user issues a root certificate issuing request, perform multi-key verification on the plurality of pieces of authenticated identity information and the plurality of pieces of authenticated enterprise information according to the plurality of digital certificates and the plurality of corresponding keys, and issue a plurality of root certificates.

9. The IPV6-based multi-element root authentication method according to claim 8, further comprising the following steps:

the IPV6-based multi-element authentication root system further comprising a binding module; and using the binding module to bind the enterprise code to the IPV6 digital address, and generate an IPV6-based domain name.

10. The IPV6-based multi-element root authentication method according to claim 8, further comprising the following steps:

the IPv6-based multi-element authentication root system further comprising a stroke digitizing module; and using the stroke digitizing module to convert each of the Chinese characters in the plurality of pieces of identity information into a set of digital codes according to a stroke digital code table.

11. The IPV6-based multi-element root authentication method according to claim 8, further comprising the following steps:

providing a central control module, and a communication module, an identity authentication module, a key module and a storage module connected to the central control module;

using the communication module to realize a communication between the IPV6-based multi-element authentication root system and an external server;

using the identity authentication module to authenticate biological identification data inputted by the user to generate authenticated biological identification data, and authorize the user after the authentication is passed;

using the key module to store the plurality of keys, and encrypt the plurality of pieces of authenticated identity information and the plurality of pieces of authenticated enterprise information according to corresponding keys in the plurality of keys to generate a plurality of pieces of encrypted authenticated identity information and a plurality of pieces of encrypted authenticated enterprise information;

using the storage module to store the authenticated biological identification data, the plurality of pieces of encrypted authenticated identity information, the plurality of pieces of encrypted authenticated enterprise information, the electronic private seal, the electronic common seal and the plurality of root certificates; and using the central control module to receive an input and control operations of other modules, and allow the user after being authorized to invoke the electronic private seal and the electronic common seal.

* * * * *